United States Patent [19]
Main

[11] Patent Number: 5,528,216
[45] Date of Patent: Jun. 18, 1996

[54] VEHICLE ANTI-THEFT BRAKE LOCKING SYSTEM

[76] Inventor: Louis Main, 1709 Sunny Crest La., Bonita, Calif. 91902

[21] Appl. No.: 56,529

[22] Filed: Aug. 23, 1993

[51] Int. Cl.⁶ ................................. B60R 25/10
[52] U.S. Cl. .................. 340/426; 340/425.5; 307/10.2; 180/173
[58] Field of Search .......... 340/825.69, 825.72, 340/425.5, 426; 307/10.2; 180/173, 271, 225; 188/1.11

[56] References Cited

U.S. PATENT DOCUMENTS

| | | | |
|---|---|---|---|
| 2,522,835 | 9/1950 | Mayrath . | |
| 2,690,824 | 10/1954 | Forman . | |
| 3,597,921 | 11/1969 | McBurnett | 188/353 |
| 3,698,505 | 10/1972 | Webley | 180/114 |
| 3,910,372 | 10/1975 | Mozzar . | |
| 4,018,314 | 4/1977 | Richmond et al. | 188/353 |
| 4,546,846 | 10/1985 | Myers | 180/287 |
| 4,578,948 | 4/1986 | Huston | 417/315 |
| 4,579,202 | 4/1986 | McIntosh | 417/315 |
| 4,670,746 | 6/1987 | Taniguchi | 417/315 |
| 4,770,613 | 9/1988 | Hoover | 417/315 |
| 4,824,332 | 4/1989 | Perkins | 417/315 |
| 4,825,210 | 4/1989 | Bachhuber | 417/315 |
| 5,154,493 | 10/1992 | Futrell et al. | 303/89 |

FOREIGN PATENT DOCUMENTS

| | | |
|---|---|---|
| WO911348 | 8/1991 | European Pat. Off. . |
| 4130028 | 3/1993 | Germany . |
| 313694 | 3/1989 | United Kingdom . |

*Primary Examiner*—John K. Peng
*Assistant Examiner*—Daryl C. Pope
*Attorney, Agent, or Firm*—Terry M. Gernstein

[57] ABSTRACT

A vehicle anti-theft system is remotely operable and includes a pump fluidically connecting a reservoir of hydraulic fluid to a hydraulic cylinder of a vehicle braking system. The system further includes a pump control circuit that operates the pump to pump fluid into the braking system hydraulic cylinder to lock the vehicle brakes and to stop the pump as soon as the pressure in the braking system reaches a predetermined value. In one form of the system, operation of a remotely controlled switch deactivates the system and re-orients a valving system so operation of the pump drains the braking system by moving hydraulic fluid from the braking system back into the fluid reservoir. The pump control circuit stops the pump when pressure in the braking system drops to a predetermined level, and can include a timer to automatically stop the pump after a predetermined time of draining operation whereby the drainings does not deprive the braking system of sufficient fluid to operate in a normal manner. One form of the invention includes a reversible pump. Other forms of the system include op-amps, voice recognition circuits and transistor switches.

13 Claims, 8 Drawing Sheets

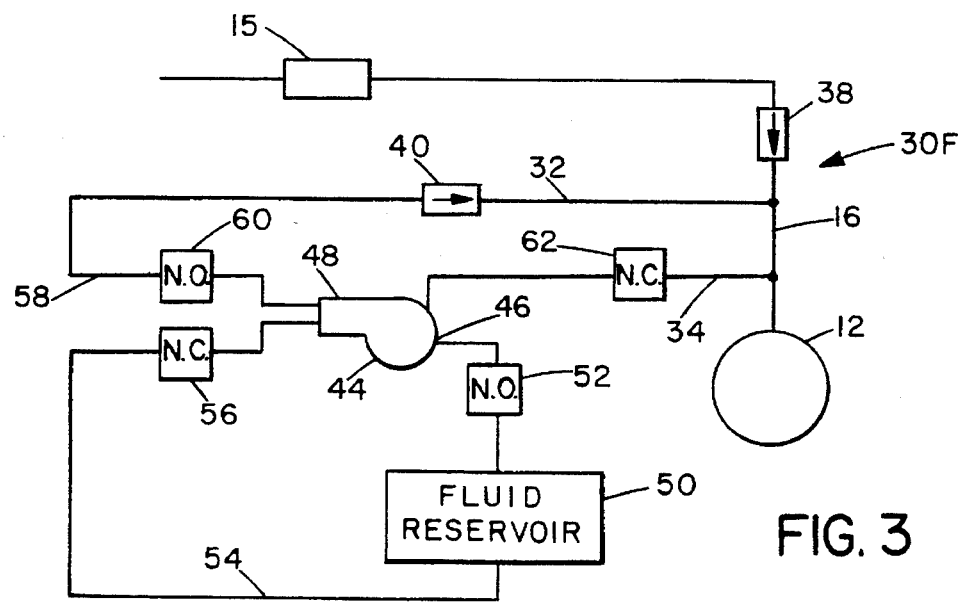
FIG. 3
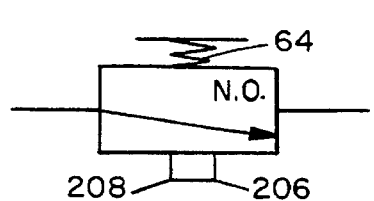
FIG. 4
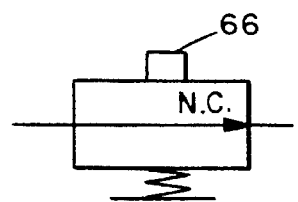
FIG. 5
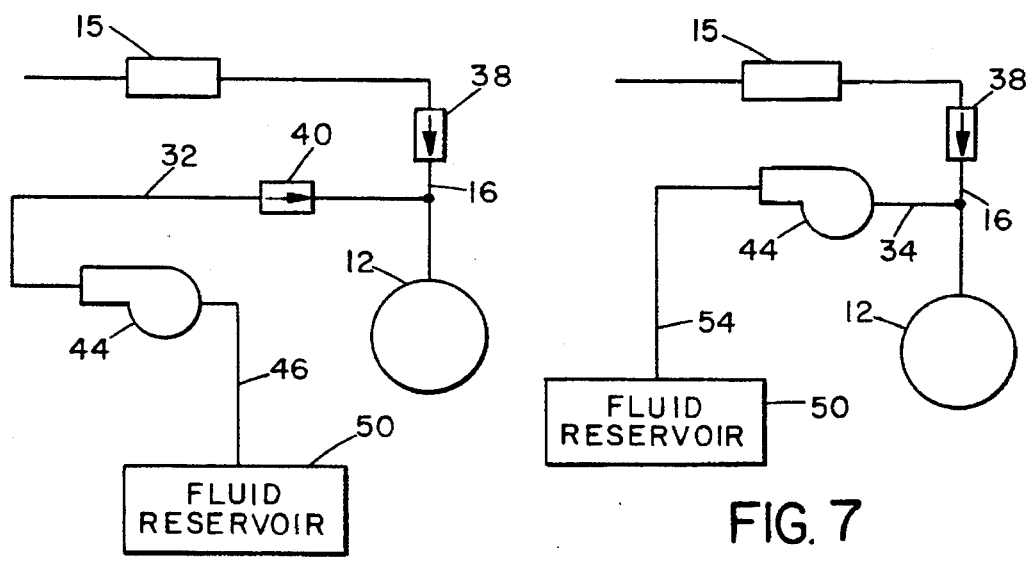
FIG. 6
FIG. 7

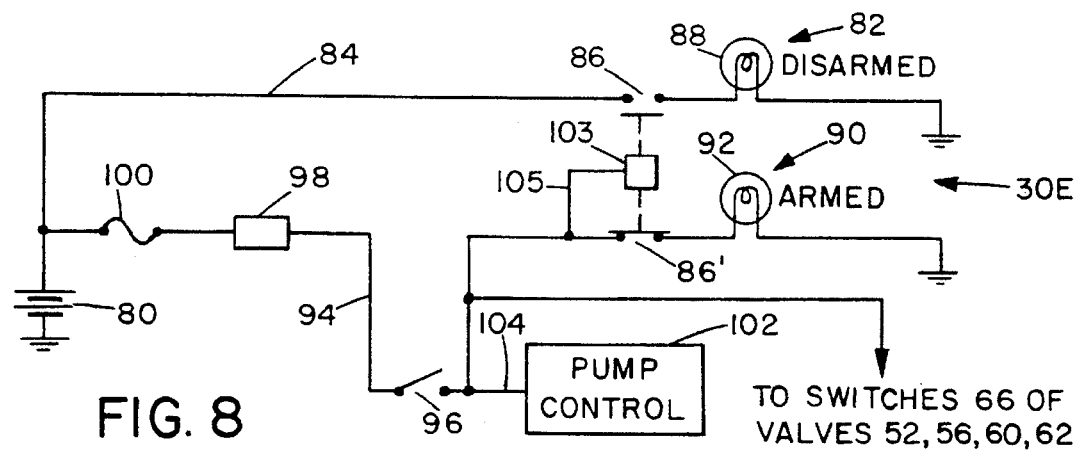
FIG. 8
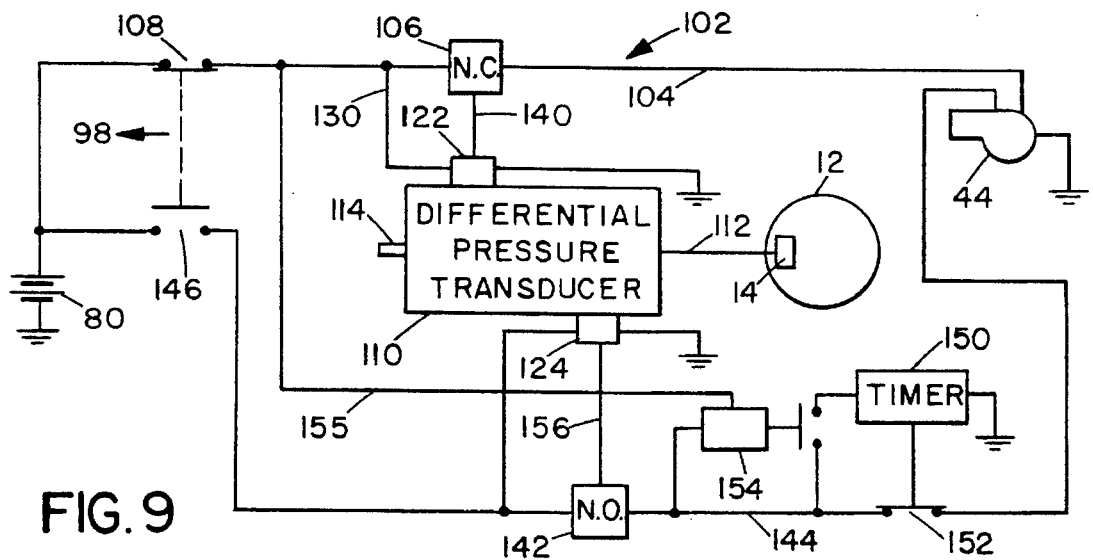
FIG. 9
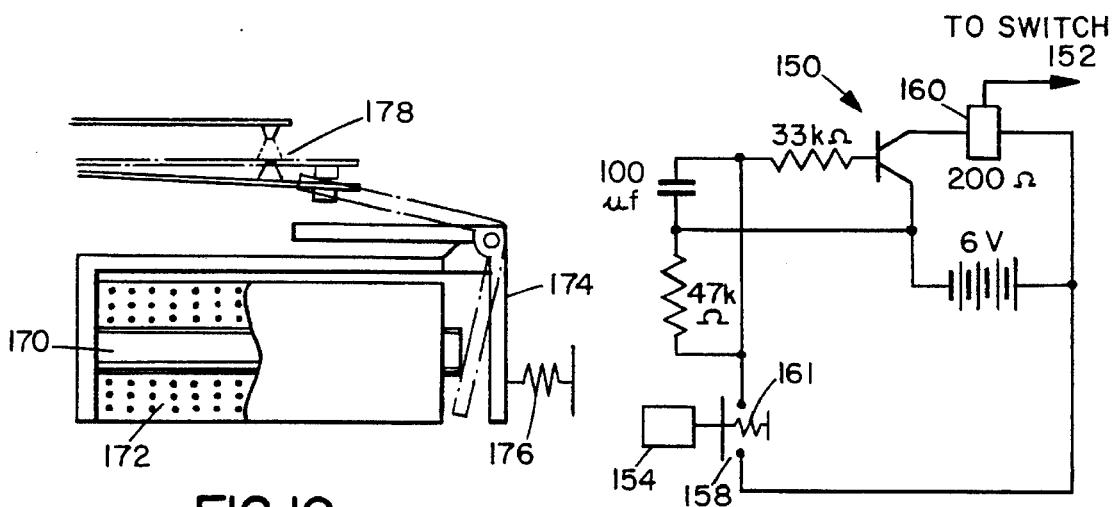
FIG. 10
FIG. 11

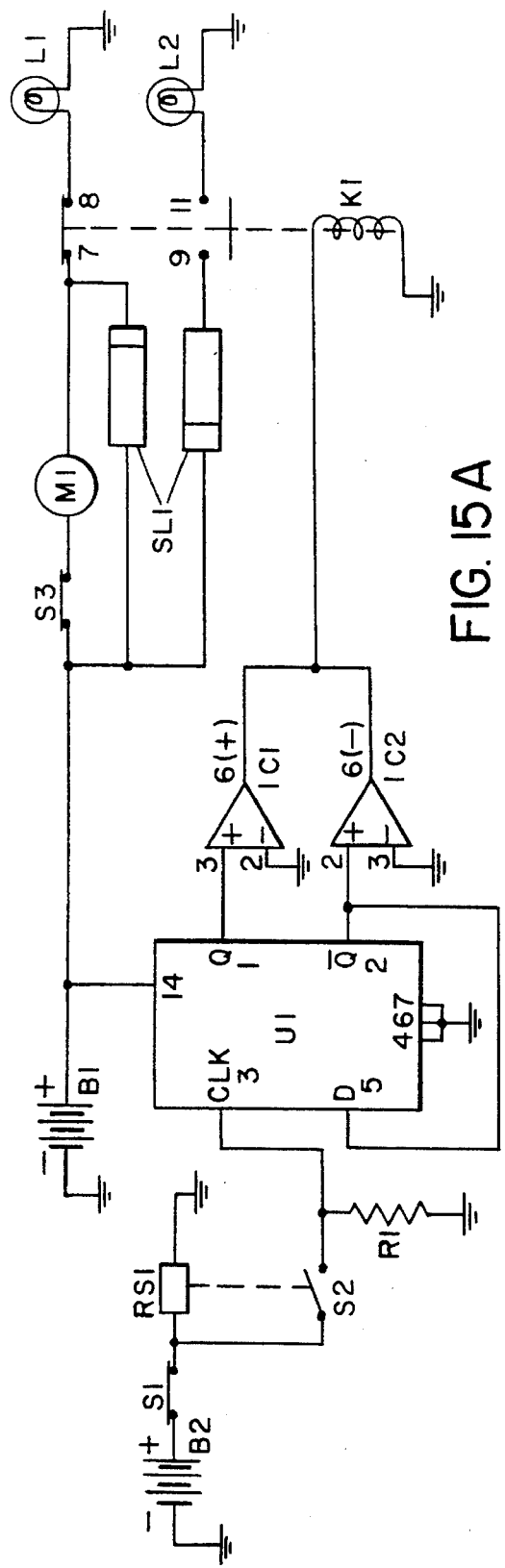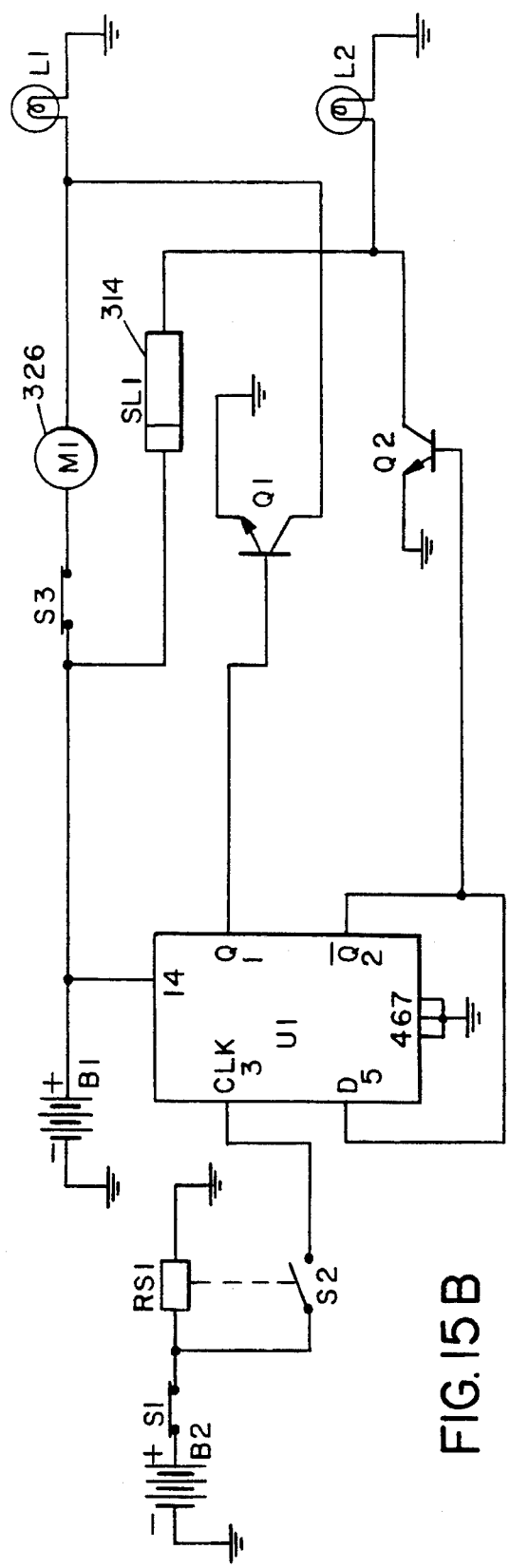
FIG. 15A
FIG. 15B

- S1 IGNITION SWITCH
  WHEN VEHICLE IS IN THE ON CONDITION, ANTI-THEFT SYSTEM CANNOT BE ENERGIZED.
- S2 REMOTE SENSOR OUTPUT SWITCH INCORPORATES A 5 SECOND LATCH-ON CAPABILITY.
- S4 REMOTE TRANSMITTER ON-OFF SWITCH PREVENTS INADVERTENT ACTIVATION OF S5.
- S5 REMOTE TRANSMITTER SWITCH MOMENTARY CONTACT.
- 3 WAY SOLENOID VALVE WHICH INCORPORATES LATCHING MECHANISM.

VEHICLE ANTI-THEFT BRAKE LOCKING SYSTEM

TECHNICAL FIELD OF THE INVENTION

The present invention relates to the general art of motor vehicles, and to the particular field of anti-theft devices for motor vehicles.

BACKGROUND OF THE INVENTION

As is well known, theft of motor vehicles is a crime that has reached epidemic proportions in recent years. It has been estimated that some vehicles, such as expensive sports cars, are subject to being stolen within minutes of being left on the street in some major U.S. cities. Simply locking the doors an effective deterrent to most car thieves. For this reason, vehicle anti-theft devices and systems have proliferated. These devices range from simple locks to sophisticated vehicle tracking systems that use a Global Tracking Network. While such devices have been somewhat successful, each has its own disadvantages. Some are so simple as to be easily circumvented; whereas, others are so expensive that only extremely expensive vehicles warrant use of such systems.

One form of anti-theft system that has been includes means for locking the vehicle steering system or locking the vehicle brake system whereby the vehicle cannot be moved without releasing the lock. U.S. Pat. No. 3,910,372 is an example of an anti-theft system that locks the vehicle brakes. Such systems generally include a solenoid that locks the brakes by controlling the hydraulic pressure of the brake system. The solenoid activated by a key system. Therefore, a vehicle owner is required to be physically present at the vehicle to activate the system. This may cause some problems, especially in a high crime rate area.

Still further, a solenoid by itself may not permit the vehicle owner to control the amount of braking that is applied by the anti-theft system. In some instances, the owner may want to set the braking system to prevent any wheel movement at all; whereas, in other cases, the owner may want to permit small movement of the wheels.

Therefore, there is a need for a vehicle anti-theft system that locks the brakes of the vehicle in a manner that permits the owner to set the desired degree of braking and will also permit the vehicle owner to activate or deactivate the anti-theft system remotely.

OBJECTS OF THE INVENTION

It is a main object of the present invention to provide a vehicle anti-theft system that permits a vehicle to adjust the system to suit his or her needs.

It is another object of the present invention to provide a vehicle anti-theft system that can be adjusted and can also be activated and deactivated remotely.

It is another object of the present invention to provide a vehicle anti-theft system that has failure-preventing features.

It is another object of the present invention to provide a vehicle anti-theft system that can prevent rotation of the vehicle wheels.

SUMMARY OF THE INVENTION

These, and other, objects are achieved by vehicle anti-theft system that sets the brakes of the vehicle when activated, and releases those brakes when de-activated. The system can be operated remotely, and includes controlled pumping systems that set the brakes when activated, and release the entire system when de-activated.

More specifically, the system includes a hydraulic pump and reservoir system that pumps fluid into the vehicle brakes when activated, and pumps fluid out of the brakes when the system is de-activated. The amount of fluid pumped into the brakes can be set according to the braking pressure desired. One form of the invention includes a reversible pump. The system also includes a timer mechanism so the pumping system will not interfere with the desired braking action of the vehicle. The pressure in the braking cylinders is measured against ambient pressure and the differential pressure is used to control pump operation.

BRIEF DESCRIPTION OF THE DRAWING FIGURES

FIG. 3 is a schematic illustrating the anti-theft brake applying system embodying the present invention.

FIG. 4 is a schematic illustrating a normally open fluid flow valve used in the system of the present invention.

FIG. 5 is a schematic illustrating a normally closed fluid flow valve used in the system of the present invention.

FIG. 6 is a schematic illustrating the anti-theft vehicle brake applying system of the present invention in the activated state in which fluid is being pumped into the brake system to apply the brakes.

FIG. 7 is a schematic illustrating the anti-theft vehicle brake applying system of the present invention in the deactivated state in which fluid is being pumped out of the brake system to release the brakes.

FIG. 8 is a basic electrical circuit diagram of the system of the present invention illustrating the manually activating switch and the remotely controlled activating switch in conjunction with the pump control system and the system-condition indicating system.

FIG. 9 is a schematic illustrating the pump control system in which pump operation is controlled according to the pressure in the braking system vis a vis ambient pressure.

FIG. 10 is a schematic illustrating a solenoid controlled switch that can be used in the system of the present invention.

FIG. 11 is a schematic of a timer circuit that can be used to de-activate the pump after that pump has evacuated the braking system of fluid used to prevent theft of the vehicle whereby the anti-theft system of the present invention will not interfere with normal braking operations of the vehicle.

FIG. 15A is an electronic schematic of an alternate electrical system for use in conjunction with the anti-theft system.

FIG. 15B is an alternate remote control circuit for the system.

DETAILED DESCRIPTION OF THE PREFERRED EMBODIMENT OF THE INVENTION

Figure 1A:
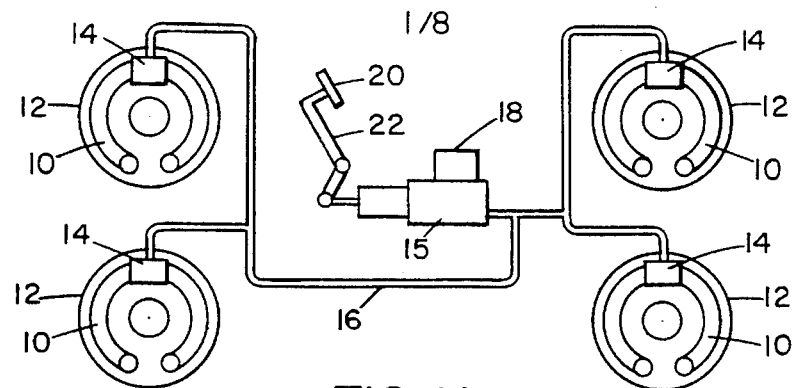
FIG. 1A is schematic showing a vehicle braking system.
Figure 1B:
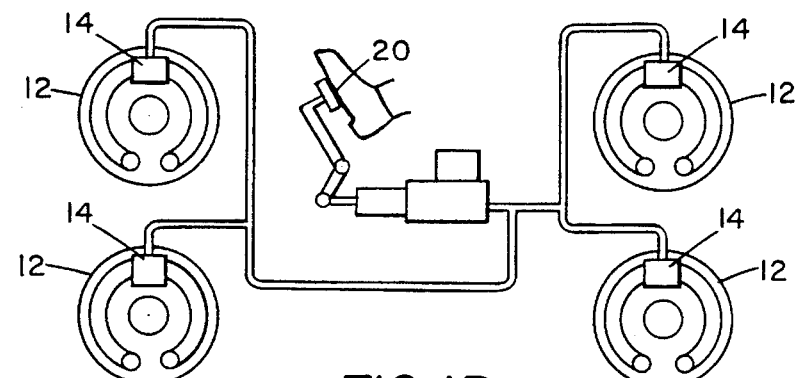
FIG. 1B is schematic showing a vehicle braking system in the neutral condition as braking pressure is about to be applied to the brake pedal of the vehicle.
Figure 1C:
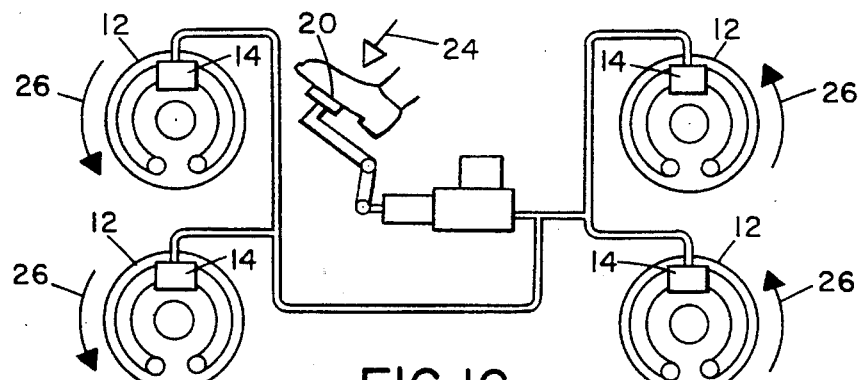
FIG. 1C is schematic showing a vehicle braking system in the braking condition as braking pressure is being applied to the brake pedal of the vehicle.

As indicated in FIGS. 1A–1C, a vehicle braking system includes shoe-type brake elements 10 in each wheel 12. The elements 10 are operated by a hydraulic system that includes a hydraulic cylinder 14 fluidically connected to a master cylinder 15 via suitable fluid conduits, such as conduit 16. The master cylinder is fluidically connected to a main system oil reservoir 18, and is operated by means of a foot pedal 20 mechanically connected thereto by a suitable linkage 22.

As indicated in FIGS. 1B and 1C, actuation of the foot pedal in the direction indicated in FIG. 1C by arrow 24 forces hydraulic fluid from the master cylinder into the hydraulic cylinders 14 thereby moving the brake shoe/puck-like elements into a braking position against a brake drum or disc rotor. Such action by the elements 10 slows rotation of the wheels, with such rotation being indicated by arrows 26 in FIG. 1C. With the cylinder 10 actuated and the shoe/puck-like elements 10 in the FIG. 1C condition, movement of the wheels is retarded. If the hydraulic pressure exerted by the cylinder 14 is great enough, the wheels will be essentially immobilized. With slight hydraulic pressure, the wheel movement will be retarded, but not prevented. In this manner, the amount of braking force can be adjusted to fit a particular situation.

The anti-theft system of the present invention utilizes this vehicle braking system and its ability to be adjusted to set the amount of braking pressure as desired. The overall anti-theft system is generally indicated at 30 in FIG. 2. The system 30 is fluidically connected to the vehicle braking system via input conduit 32 and outlet conduit 34. The conduit 16 is modified only to include fluid connection means, such as a tee connection 36, or the like, to accommodate system 30. If desired, a one-way valve 38 can be inserted into the conduit 16. A second one-way flow control valve 40 is also positioned in the input conduit 32 so hydraulic fluid will flow in the desired directions during vehicle braking maneuvers as well as during actuation and deactuation of the anti-theft system as will be understood by those skilled in the art based on the teaching of the present disclosure.

The anti-theft system 30 includes a fluid circuit and an electrical circuit. Each of these circuits will be discussed individually for the sake of clarity of discussion.

The fluid circuit is shown in FIGS. 3–7. The fluid circuit is indicated as system 30F and includes a fluid pump 44, such as a positive displacement pump that is well known in the fluid handling art. A rotary pump can be used if desired. Other suitable pumps can be found in standard references, such as "Marks Standard Handbook for Mechanical Engineers," published by McGraw-Hill, or other such reference books. The pump 44 includes an inlet 46 and an outlet 48, with the outlet 46 being fluidically connected to a hydraulic fluid reservoir 50 via a fluid control valve 52. The outlet 48 is fluidically connected to the reservoir via a conduit 54 having a flow control valve 56 therein, and to the braking system conduit 16 via a conduit 58 having a flow control valve 60 therein connecting the conduit 32 to the conduit 58. As is also shown in FIG. 3, outlet line 34 is fluidically connected to the pump inlet end via a flow control valve 62.

The flow control valves are either a normally open valve N/O as shown in FIG. 4 or a normally closed valve N/C as shown in FIG. 5. As will be understood from the following discussion, the valves are electrically controlled to work in conjunction with each other whereby fluid flow in the circuit is either from the reservoir to the wheel braking cylinders (FIG. 6) or from the wheel braking cylinders to the reservoir (FIG. 7) depending upon whether the anti-theft system 30 is activated or deactivated. One form of the fluid control valves includes a spring 64 that biases the valve into one position and an electrical control element, such as a solenoid 66, or the like that operates against the bias of the spring to move the fluid flow control valve into the opposite configuration when actuated. For the sake of being consistent with the electrical circuit description, the normally open condition for a fluid control valve will be a flow-preventing configuration and a normally closed configuration will be a flow permitting configuration.

As can be seen in FIGS. 3 and 6, in one configuration of the system, herein referred to as the activated configuration, the valves 52 and 60 are moved from their normally open configuration to a closed configuration, while the valves 56 and 62 are moved from their normal closed configuration to an open configuration. The flow circuit thus is configured so operation of the pump 44 causes hydraulic fluid to flow from the fluid reservoir 50 to the wheel braking cylinder via the conduits 46 and 32 and the valve 40.

On the other hand, activation of the electrical circuit into a condition to de-activate the anti-theft system causes the fluid flow control valves to move to the opposite conditions whereby valves 52 and 60 re-configure to their open condition and the valves 56 and 62 re-configure to their closed condition so that operation of the pump 44 causes fluid to flow from the wheel braking cylinders to the reservoir 50 via conduits 34 and 54 as the other conduits are "open circuited."

The controls 66 of the fluid flow control valves are ganged together so that they all operate together. In other words, a single signal will be sent to all valves and the valves will all move from one configuration to the other configuration as above described. As will be discussed below, this signal will be generated remotely by the vehicle owner to either activate the anti-theft braking system (FIG. 6) or de-activate it (FIG. 7). The ganging of the switches can be either mechanical or electrical.

The electrical system for system 30 is shown in FIGS. 8–12 and is indicated by reference number 30E. System 30E is broadly indicated in FIG. 8 as including a power source 80, such as the vehicle battery, a self-contained battery, or the like. The battery is electrically connected to a system-disarmed indicator 82 via a first electrical lead 84 having a switch 86 therein. The indicator 82 is shown as including a visible indicator, such as a light 88, an LED, or the like, but could include an audible indicator as well. The indicator is grounded on one side and connected to the power source via the switch 86 on the other side whereby when the switch 86 is closed, the simple circuit formed activates the indicator 88. The system 30E also includes a system armed indicator 90 that includes a visible indicator, such as a light 92, or the like, connected on one side thereof to ground and at the other side thereof to the power source 80 via an electrical lead 94 having a plurality of switches therein. The switches in lead 94 will be discussed below. However, when all the switches in lead 94 are closed, power from the power source 80 is conducted to the light 92 to activate that light in the manner of a simple circuit. As will be understood, the systems 82 and 90 are arranged to be mutually exclusive whereby when one system is operating, the other is de-activated. This will serve to alert a vehicle operator that the anti-theft system 30 is either activated or de-activated. The lights 88 and 92 can be located on the dashboard of the vehicle, and any audible alarms associated therewith can also be located on the dashboard so the vehicle operator will be made aware of the condition of the anti-theft system at all times.

The system 30E includes a plurality of electrical switches in electrical lead 94 so the anti-theft system must be turned on manually and then activated using another switch. Requiring the activation of two switches ensures that the system will not be inadvertently activated while the vehicle is being operated. The system thus includes a manually operated switch 96 that can be located on the vehicle dashboard or on the vehicle steering column or the like, and a remotely controlled switch 98 that can be located inside the engine compartment. Preferably, the switch 98 is located in a position that prevents a potential thief from gaining access thereto. Both switches 96 and 98 can be key-operated switches. A fuse 100 is also included in the lead 94 so a short in the system causes it to fail in the unlocked, or disarmed, condition. Such disarmed failure will be referred to as a fail-safe condition. The system 30E also includes a lead that connects the remotely controlled switch 98 to the controls of the valves 52, 56, 60 and 62 to actuate those controls into the FIG. 6 configuration upon initial activation of the switch 98 after the mechanical switch 96 is activated, and to move those valves into the opposite configuration, FIG. 7, when the remotely controlled switch 98 is operated a second time. The circuit 30E also includes a pump control circuit 102 electrically connected to the lead 94 by a lead 104.

The mutual exclusivity between switches 86 and 86' is achieved, in one form of the system, by placing a solenoid 103 between switch 86 and switch 86'. The solenoid 95 is biased to keep the switch 86 closed thereby keeping the system disarmed system activated. However, the solenoid 103 is electrically connected to the power source 80 by lead 105. As soon as the switches 96 and 98 are activated, power is applied to the solenoid 95 to overcome the internal bias to move the switch-86 into a circuit opening configuration and to move the switch 86' into a circuit closing configuration. Another form of the system will have a mechanical connection between the switches to achieve the just-discussed ganging thereof.

As is best shown in FIG. 9, the pump 44 is connected to the power source 80 via the electrical motor control circuit 102. This circuit includes the electrical lead 104 connecting the pump 44 to the power source via a switch 106 that is normally closed to complete the electrical connection of the lead. However, this switch 106 will be shifted to an open circuit configuration-upon receiving a signal as will be discussed below. A second switch 108 is also located in lead 104 and is connected to the remotely controlled switch 98 to be closed when the-remotely controlled switch 98 is operated. Activating the remotely controlled switch 98 will close the circuit to the pump 44 and activate that pump.

As above discussed, when the system 30F is in its normal configuration, it will be in the FIG. 6 condition and the fluid valves will be organized so that activation of the pump 44 will force fluid into the brake cylinders 14. Such action will continue until the pump is de-activated. This de-activation occurs automatically in the system 30 as soon as the pressure inside the brake cylinders reaches a level that the vehicle owner has predetermined to be sufficient for his or her purposes. This level can be high enough so the vehicle cannot be moved at all, or it can be low enough so the vehicle can be moved slightly.

Figure 12:
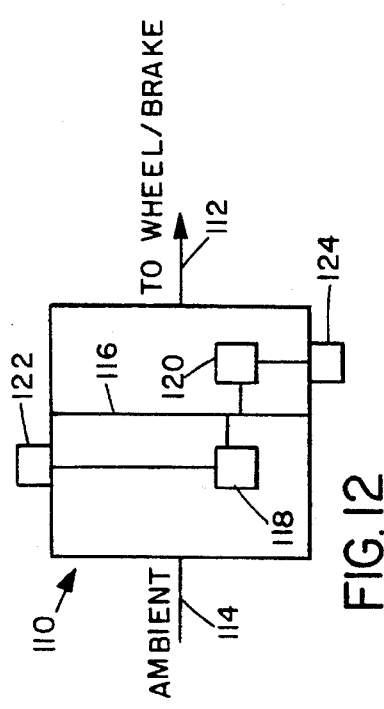
FIG. 12 is a schematic illustrating a pressure differential transducer that is used in conjunction with the pump of the present system so the braking pressure applied by the anti-theft system can be adjusted by a vehicle owner to suit his or her needs.

The system 30E includes means for setting this brake applying pressure, and this means comprises a pressure differential transducer 110 shown in FIGS. 9 and 12 to have a first fluid conduit 112 fluidically connected to the hydraulic cylinder 14 of the wheel/brake element 12 to sense the pressure in the hydraulic cylinder 14 and a second conduit 114 fluidically connecting the other side of the transducer to ambient pressure. Other pressure can be used as the reference pressure for transducer 110 if desired; however, ambient pressure is the most convenient. Pressure in the cylinder 14 is compared to ambient pressure by movement of a diaphragm 116. This movement represents pressure differential between the reference pressure in chamber A and brake cylinder pressure in chamber B of the transducer, and is sensed by strain gauges 118 and 120. The strain gauges are connected to switches 122 and 124 respectively. The switch 122 is connected to the switch 106 and moves that switch from a circuit completing position to a circuit opening position when the pressure differential sensed by the transducer 110 exceeds a preset value. The switch 122 is not activated until the strain gauge 118 emits a signal of a predetermined strength. The value of-this predetermined strength is set by adjusting the switch 122 by a rheostat 122R or the like. A similar rheostat 124R is associated with the switch 124 and serves the same purpose of permitting the amount of braking pressure applied by the anti-theft system to be adjusted as desired. The rheostats can be located on the vehicle dashboard, or can be located in a hidden and locked location on the vehicle if suitable. The rheostats can be adjusted by the vehicle owner or at the factory. The switch 122 can be a solenoid switch having a spring biasing the plunger into a circuit opening configuration, with the amount of spring force being adjusted by a knob on the switch to set the amount of potential drop that must be generated by the strain gauge 118 to move the plunger from a circuit opening position to a circuit closing position against the bias of the spring in the switch. The switch 122 is connected at one end to the power source 80 via a lead 130 and to ground at the other side thereof by a lead 132. Thus, when the bias of the spring in the switch 122 is overcome, the switch moves to a position that either applies power to the switch 106 or releases power from that switch. The switch 106 is a solenoid switch that is spring biased, and once power is removed or applied to the switch, the plunger in that switch moves to another position. This will either open or close the switch according to its previous setting. In the instant situation, the switch 106 is normally closed to complete the circuit between the power source and the pump. Therefore, when the switch 122 is closed, power is applied via the lead 130 and the switch 122 and lead 140, to the switch 106. This power moves the switch 106 to a circuit opening configuration to remove power from the pump 44. This stops the pump when pressure in the hydraulic cylinder 14 has reached a predetermined level.

The opposite operation occurs when the remotely controlled switch 98 is operated to de-activate the system. The strain gauge 120 is connected to the switch 124 that is electrically connected to a switch 142 that is positioned in an electrical lead 144 connecting the pump 44 to the power source 80. A switch 146 is also located in lead 144, and is ganged, either mechanically or electrically, to the switch 108 to be in a circuit opening configuration when the switch 108 is in a circuit closing configuration and vice versa. The gang movement of the two switches 108 and 146 is controlled by activation of the remotely controlled switch 98. The default configuration is shown in FIG. 9 so that operation of the switch 98 to initially set the anti-theft system will move the switches 108 and 146 into the FIG. 9 configuration, and operation of the switch 98 to de-activate the system will move those switches into the opposite configurations.

With switches 146 and 142 closed, power is applied to the pump 44. When the switch 98 is operated to de-activate the system, the flow control valves are switched to the FIG. 7 configuration so that operation of the pump 44 moves fluid out of the hydraulic brake cylinders 14 to drain hydraulic fluid from those cylinders.

If the pump were permitted to continue operating in this mode, the brake system of the vehicle could not be operated as any fluid forced into the brake cylinders from the master cylinder would be removed by the pump. While the differential pressure transducer 110 is designed to shut the pump off after the pressure in the brake cylinder has dropped to a pre-set level, there may be situations that the vehicle is being operated before this pre-set pressure is reached. Such a situation may occur if the vehicle is moved before the fluid is fully drained from the system by pump 44. In such a situation, application of the brakes in the normal manner as described above in conjunction with FIGS. 1A–1C may tend to keep the pressure in the brake cylinders above the preset pressure thereby preventing the transducer 110 from automatically shutting the pump off. This situation is not desirable as it may vitiate normal operation of the brake system and may also keep the pump operating longer than desired. Therefore, the system 30E includes a timer mechanism 150 that operates a switch 152. The switch 152 is normally in a circuit closing condition as shown in FIG. 9, but will be moved into a circuit opening condition by the timer mechanism 150. The timer mechanism is activated by a solenoid 154 that is energized via a lead 155 connected to the lead 104. The solenoid 154 is connected to a switch 158 of the timer mechanism to close that switch 158 when the switch 108 is closed. The timer circuit will be discussed below, and begins its timing operation when the switch 108 is opened. The switch 124 is controlled by the strain gauge 120 that senses a negative value of the differential pressure sensed by the strain gauge 118. Therefore, when the differential between the pressure in hydraulic cylinders 14 vis a vis ambient pressure drops below a preset value, the strain gauge emits a signal that is strong enough to activate switch 124 by overcoming the spring bias forcing the switch into a first configuration. As soon as the switch 124 closes, it operates the switch 142 to move that switch into a circuit opening configuration thereby disconnecting the pump from the power source 80 and stopping the pump.

In order to ensure that the pump does not operate in a manner to defeat desired braking, the timer mechanism will automatically shut down the pump after a preset period of time no matter what the pressure in the hydraulic cylinders 14 is. This timer mechanism is best shown in FIG. 11 as being activated when switch 158 is operated by the solenoid 156, and will operate for about eight seconds based on the values indicated in FIG. 11. The solenoid 154 is connected to conductor 104 via a lead 155 and is activated as soon as the switch 108 is moved into the circuit closing condition. The relay moves the switch 158 into the closed condition. When the switch 158 is closed, the 100 microfarad capacitor rapidly charge up at about 0.7 V. The transistor will be forward biased, and collector current will flow operating the relay 160. This relay keeps the switch 152 in the circuit closing condition against a bias of a spring in that switch 152. As soon as switch 108 opens, current is released from the solenoid in a manner that causes that solenoid to release the switch 158. The switch 158 includes a spring 161 that biases the switch into the open condition shown in FIG. 11. Releasing the switch 158 causes the capacitor to begin to discharge via the 33 Kohm resistor at the base of the transistor. When the voltage across the capacitor gets down to half a volt or so, the transistor base will no longer be forward biased, and collector current will cease. This causes the relay 160 to drop out. With the relay dropped out, the internal-bias in the switch 152 opens that switch thereby removing power from the pump after a preset time period. The timer mechanism is another element in a fail-safe system and permits the vehicle braking system to operate even if the pressure transducer 110 has not shut the pump off after the predetermined time. Changing the values of the circuit elements shown in FIG. 11 will adjust the time delay.

A spring biased relay that is suitable for use in the circuit 30E is shown in FIG. 10 as including a core 170 surrounded by a coil 172. Applying power to the coil causes an armature 174 to move against the bias applied thereto by a spring 176. The armature is connected to a contact switch 178 to open or close the contacts of the switch depending on the position of the armature.

Operation of the system is evident from the foregoing, and thus will only be summarized. When the system is initially installed, as by retro-fitting or by factory installation, the fluid system 30F is in the FIG. 7 condition, and the system 30E is in the dotted line condition indicated in FIG. 9 with the switch 86 in the circuit closing condition whereby the light 88 is activated. The anti-theft system is initially operated by closing the switch 96, and operating the remotely controlled switch 98. This action energizes switches 52 and 60 to place the fluid circuit in the FIG. 6 configuration and energizes switches 108 and 106 to place the electrical circuit into the full line condition shown in FIG. 9 while also closing switches 86' and 158 and opening switch 86 to energize light 92 while deactivating light 88. The pump is operated, and forces fluid into the cylinders 14 from the reservoir 102 until the diaphragm 116 moves far enough so strain gauge 118 has sufficient potential-to activate switch 122. Activation of switch 122 activates switch 106 that disconnects the pump from the power source and stops charging the hydraulic cylinders 14. The brakes of the vehicle are now locked, and the switch 86 is moved to activate the system armed circuit 90.

Operation of the remotely controlled switch 98 moves the fluid switches into the FIG. 7 configuration and the electrical switches 146 and 142 into a position to apply power to the pump while configuring the system to remove fluid from the cylinders 14 and move that fluid into the reservoir 50. As soon as the diaphragm 116 of the pressure differential transducer 110 moves far enough to the right in FIG. 12, the strain gauge 120 generates sufficient power to operate switch 124. Operation of the switch 124 opens switch 142. The timer is started as soon as the switch 158 is opened. Power to the pump is interrupted when the switch 142 is opened or when the timer controlled switch 152' is opened. Even if the pump does not stop under the influence of the pressure differential transducer, the switch 152 will be opened to interrupt power to the pump. The main switch 96 can be opened to ensure that the anti-theft system will not operate during operation of the vehicle. The system 82 will be activated while the light 92 is extinguished to alert the vehicle driver that the anti-theft system is deactivated.

Figure 13:
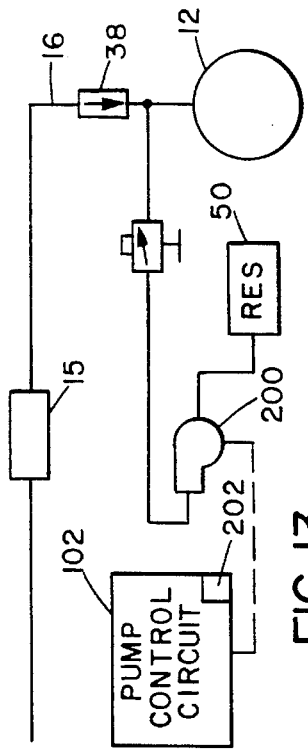
FIG. 13 is a schematic illustrating a form of the anti-theft system in which a reversible pump is used to move hydraulic fluid into the brake cylinders to lock the brake system and out of the brake cylinders to unlock the brake system for normal vehicle operation.

As shown in FIG. 13, the anti-theft system of the present invention can include a reversible pump 200 in place of pump 44. This reversible pump can be selected from any of the known reversible pumps, such as disclosed in U.S. Pat. Nos. 4,770,613, 4,824,332 and 4,578,948, the disclosures of which are incorporated herein by reference. The pump control circuit 102 discussed above is used in conjunction with reversible pump 200 to stop that pump when the pressure in the brake cylinder reaches a preset level during the locking process, and to stop the pump when the pressure in the brake cylinder reaches a preset level during an unlocking process. Since the pump control circuit has already been discussed, it will not be discussed again. The only addition to such control circuit will be a solenoid switch that moves elements on the reversible pump as described in the incorporated patents. Such additional switch is indicated in FIG. 13 as switch 202.

Figure 2:
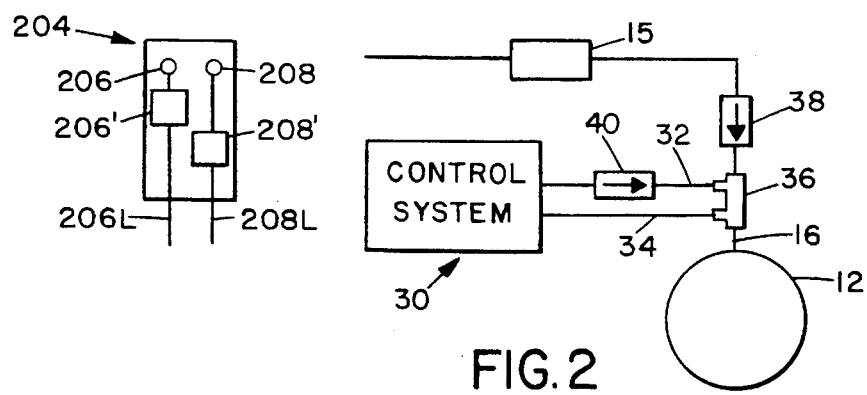
FIG. 2 is a schematic representation illustrating how a vehicle braking system is modified to accommodate the anti-theft system of the present invention.

One form of the invention includes a remote switch 204, indicated in FIG. 2 that has an "on" button 206 and an "off" button 208, with switch 98 having separate circuits 206' and 208' connected to the various solenoids via electrical leads 206L and 208L to operate those solenoids in the manner discussed above whereby the desired flow circuits (FIG. 6 or FIG. 7) or the desired direction of pump flow (FIG. 13) is established when either the "on" button or the "off" button is activated on the remote switch 98. Such activation of solenoids is well known in the art, and will not be described in detail except to direct attention to FIG. 10 and observe that application of electric current to the coil will move the armature against the force of the spring, and releasing electric power will permit the spring to move the armature. Therefore, either circuit 206' or 208' will apply power to the solenoid coil while the other removes such power. The solenoids will work in the same manner for the flow control valves, with springs 54 being substituted for spring 176, and the separate circuit connections are indicated in FIG. 4 for the sake of completeness. The remote switch 204 preferably is a hand held switch.

Figure 14:
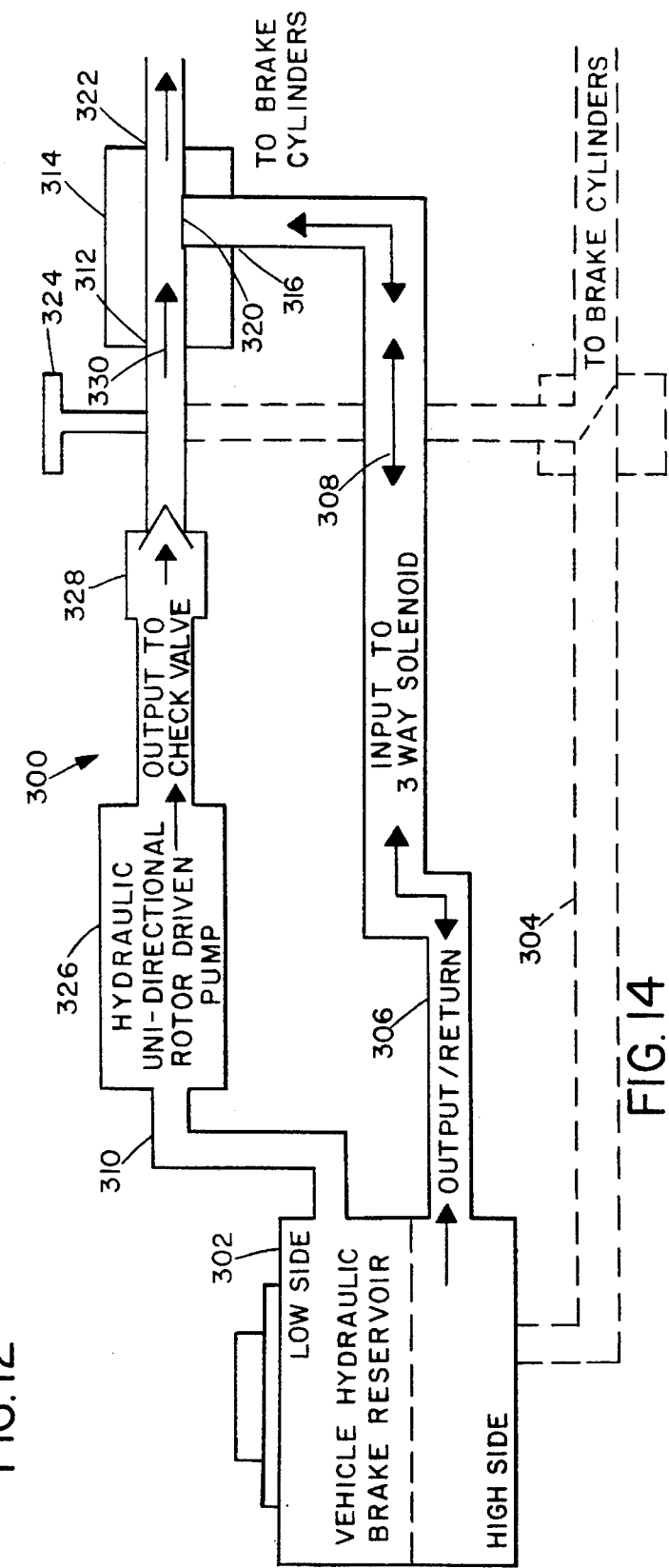
FIG. 14 is a schematic illustrating one form of the anti-theft system in conjunction with a brake system of a vehicle.

Shown in FIG. 14 is a schematic of another form of the anti-theft system of the present invention. As shown, the anti-theft system 300 is used in conjunction with the in-place brake system S of a vehicle. The in-place brake system includes a hydraulic reservoir 302 fluidically connected to the vehicle brake cylinders by fluid lines 304 and 306 with brake fluid moving in the fluid lines to and from the hydraulic reservoir as indicated by two-headed arrows 308. The anti-theft system 300 includes a fluid line 310 fluidically connected at one end thereof to the reservoir 302 and at the other end thereof to a first port 312 of a dual control latching 3-way solenoid valve (+12 vdc, high pressure) 314. As shown in FIG. 14, the hydraulic fluid line 306 is fluidically connected to a port 316 of the valve 314. The valve 312 is shown as including a flow control element 320 that directs fluid from either port 312 or port 316 to outlet port 322 that is fluidically connected to the brake cylinders. A hydraulic fluid pressure switch 324 (100 to 2000 psi, adjustable) is also included in the system. Fluidically interposed between reservoir 302 and valve 314 is a hydraulic uni-directional motor driven pump 326 (+12 vdc, 0 to 1000 psi) and a check valve 328 (30 to 2000 psi holding pressure) that insures fluid flow in direction 330 only.

As can be understood from FIG. 14, with the anti-theft system incorporated into the existing vehicle braking system, when the anti-theft system is energized, the pressure switch 324 with n/c contacts allows the hydraulic motor/pump 326 to turn on and evacuate fluid from the existing hydraulic fluid reservoir 302 and send this fluid to the braking system through check valve 328 and through port 312 to port 322 of the dual control 3-way latching solenoid 314. At motor/pump turn on, the solenoid 314 will be positioned to open the fluid path between ports 312 to 322 and close the fluid path between ports 316 to 322 permitting the brake system to become pressurized thereby locking the brakes and preventing rotation of the wheels of the vehicle. Evacuating fluid from the hydraulic reservoir 302 will, by no means,deplete the reservoir of fluid. The check valve 328 prevents the return of fluid to the reservoir 302 and motor/pump 326 thus trapping the pressure within the brake conduit to the brake cylinders.

When a predetermined pressure within the brake system has been reached, the pressure switch 324 will open, stopping the hydraulic motor/pump operation. Pressure can be sensed in the brake system using, for example, the aforediscussed pressure differential transducer 110. Pressure is then trapped in the brake conduit to the brake shoe/puck-like components.

While the anti-theft system is energized, pressure is regulated by the setting of the pressure sensing system which includes switch 324. When pressure within the system drops below a predetermined limit, the pressure switch 324 contacts are closed and again restarts the hydraulic motor/pump to maintain system pressure. When the pressure upper limit is reached, the pressure switch 324 contacts again open stopping the hydraulic motor/pump.

Figure 14A:
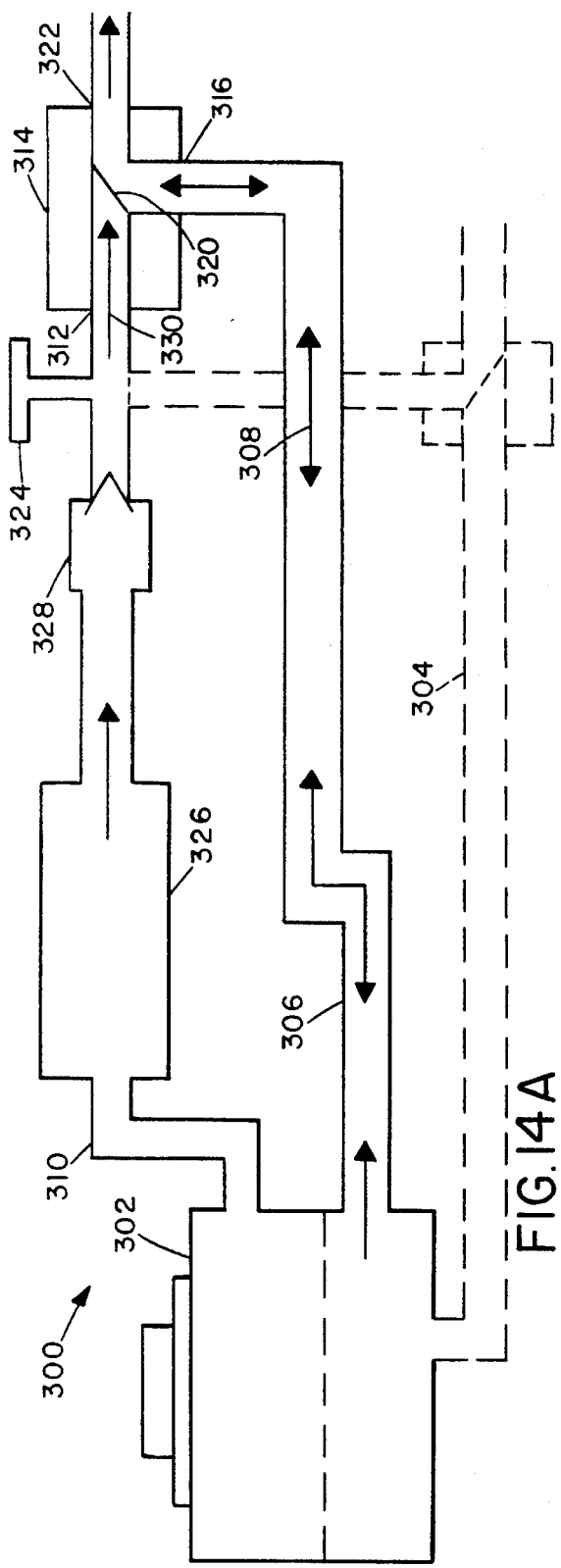
FIG. 14A illustrates the FIG. 14 system configured to operate the brakes of the vehicle in the normal manner.

As indicated in FIG. 14a, with the anti-theft system incorporated, de-energizing the system will reset the solenoid 314 to open the flow path between ports 316 and 322 and closing the flow path between ports 312 and 322 permitting the release of pressure and normal use of the vehicle braking system.

Figure 15:
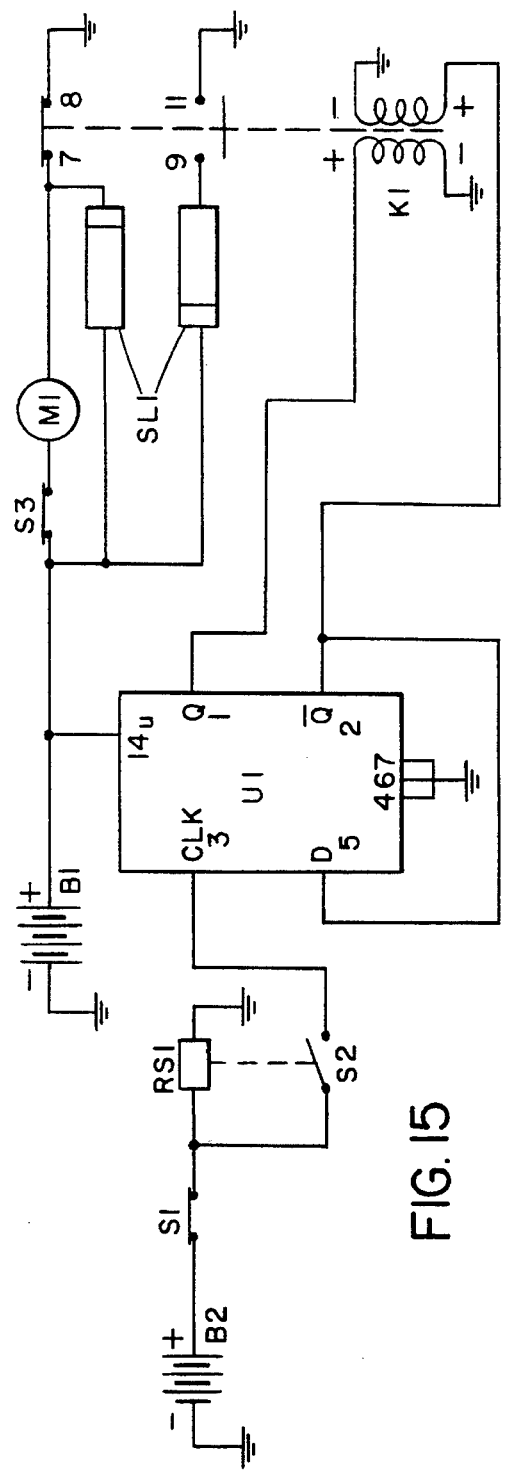
FIG. 15 is an electrical schematic illustrating a remote control circuit for the system.
Figure 15C:
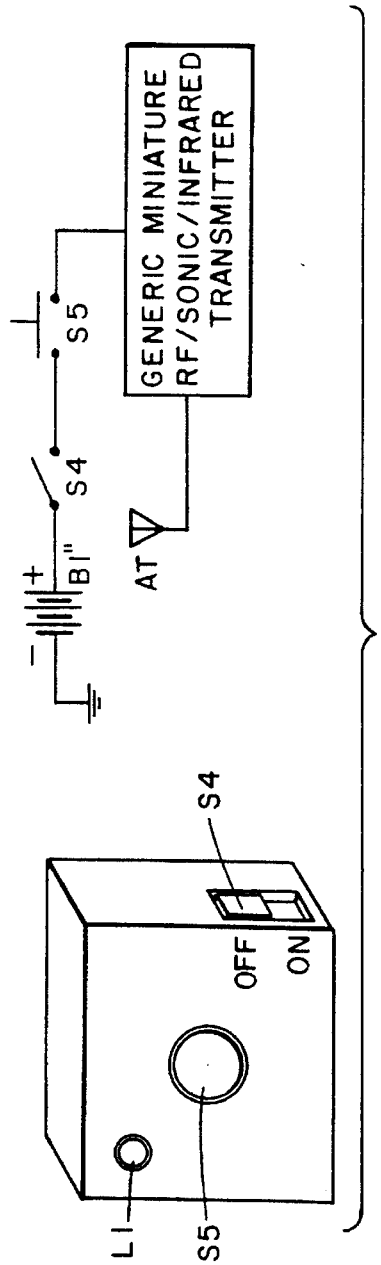
FIG. 15C illustrates the remote control circuit.

An electronic remote control circuit for the anti-theft system is shown in FIGS. 15 and 15C. Referring to these figures, it can be understood that when the vehicle is in the "off" condition ignition switch S1 is closed. Actuation of on/off switch S4 (see FIG. 15C) applies battery power (from the vehicle battery, for example) to remote control transmitter switch S5, When the remote control transmitter switch is depressed, the remote sensor switch S2 (FIG. 15) will apply a pulse to the integrated circuit flip/flop U1 at pin 3. A signal will be sent to one side of K1 via U1 pin 1. The relay; K1 will energize to close contacts 7/6 and to open contacts 9/11.

Closing relay K1 contacts 7/6 will provide a ground path for energizing the hydraulic motor/pump circuit M1 with the vehicle battery B1. This action allows the hydraulic motor/ pump to turn on. Relay contacts 7/6 will also provide a ground path for the solenoid 314 to fluidically connect ports 312 and 322, and relay contacts 9/11 will close the fluid path between ports 316 to 322. The anti-theft system is shown pressurized in FIG. 14a. Relay K1 will remain in the "on" position by a latching mechanism built into the relay K1 or by relay K1 staying energized via U1. The remote sensor switch S2 is a five second latch-on type. Element U1 pin 1 will remain high (+12 vdc) by means of U1 pin $14_u$ being connected to vehicle battery B1.

Activating the remote transmitter switch S5 (see FIG. 15C) closes the remote sensor switch S2 sending a high signal to U1 pin 3. U1 pin 1 then goes low or flips and the nigh (+12 vdc) voltage is diverted to U1 pin 2 (Qnot). This positive signal then is applied to alternate coil K1 opening relay K1 contacts 7/6 while closing contacts 9/11. Closing relay K1 contacts 9/11 provides a ground path thereby energizing the 3-way solenoid valve 314 to close the fluid path between ports 312 to 322 and opening the fluid path between ports 316 to 322 thereby allowing fluid to flow back into the vehicle reservoir 302 and relieving pressure from the system for normal brake use.

An alternate electronic schematic for the anti-theft system is shown in FIG. 15A. As shown in FIG. 15A, the alternate system includes a dual reversing relay K1' with latching capability electrically connected to two typical operational amplifiers IC1 and IC2 for control. IC1 and IC2 are inverting and non-inverting op-amps.

With a high signal (+12 vdc) out of pin I(Q) of U1', a signal is sent to relay K1' to cause that relay to latch on via the non-inverting operational amplifier IC1 thereby closing contacts 7/6 and opening contacts 9/11. This action will allow the motor/pump to be energized by the vehicle battery B1 through n/c contacts of the pressure switch S4 (FIG. 15C). Closing contacts 7/6 will also cause power to be supplied to valve 314 to open the flow path between ports 312 and 322 while the flow path between ports 316 and 322 will be closed thereby allowing pressurization of the anti-theft system.

Activating remote transmitter push switch S5 (FIG. 15C) will send a signal to U1' pin 3 via latch-on switch S2' shown in FIG. 15. This signal will cause a low voltage on pin 1(Q) of U1' and a high voltage on pin 2 (Qnot) on U1'. The output signal from U1' pin 2 will be sent to the inverting op-amp IC2. The output on pin 6 of IC2 will be inverted from the input to cause the relay K1' to actuate in the opposite direction. A positive output from U1' pin 2 (Qnot) sent to op-amp IC2 will be inverted to a negative output at pin 6 of the operational amplifier IC2 to cause relay K1' to move in the reverse direction.

A further alternative electronic set up is shown in FIG. 15B. The op-amps of FIG. 15A are replaced by transistors Q1 and Q2 in the FIG. 15B set up. Energizing the remote transmitter push switch S5 of FIG. 15C causes switch RS1 to close switch S2 and to send a high voltage signal to pin 3 of U1" causing pin 1' to go high and turn on Q1 establishing a ground path for the motor/pump 326 through n/c contacts of pressure switch S3. LED L1 is also illuminated to indicate that the system is on.

When the remote transmitter push switch S5 (FIG. 15C) is pressed a second time, RS1 closes S2 and sends a high voltage signal to pin-3 of U1". This second pulse will flip U1" and place a low signal on the output of pin 1 and a high signal out at pin 1 (Qnot) turning non Q2 and turning off Q1. With Q2 on, a ground path is established for valve 314 to fluidically connect ports 316 and 322, with LED L2 being activated to indicate that the system is off. The pressure in the system is released to return the braking system to a normal operation mode.

A schematic for a remote transmitter control is shown in FIG. 15C. When the remote transmitter on/off switch S4 is set on, power from the internal battery B1" will be sent to the remote transmitter push switch S5. When switch S5 is depressed, the lamp L1 illuminates indicated system transmission of sonic, RF, or infrared signals from the transmitter to a receiver RS1 (FIG. 15).

Figure 15D:
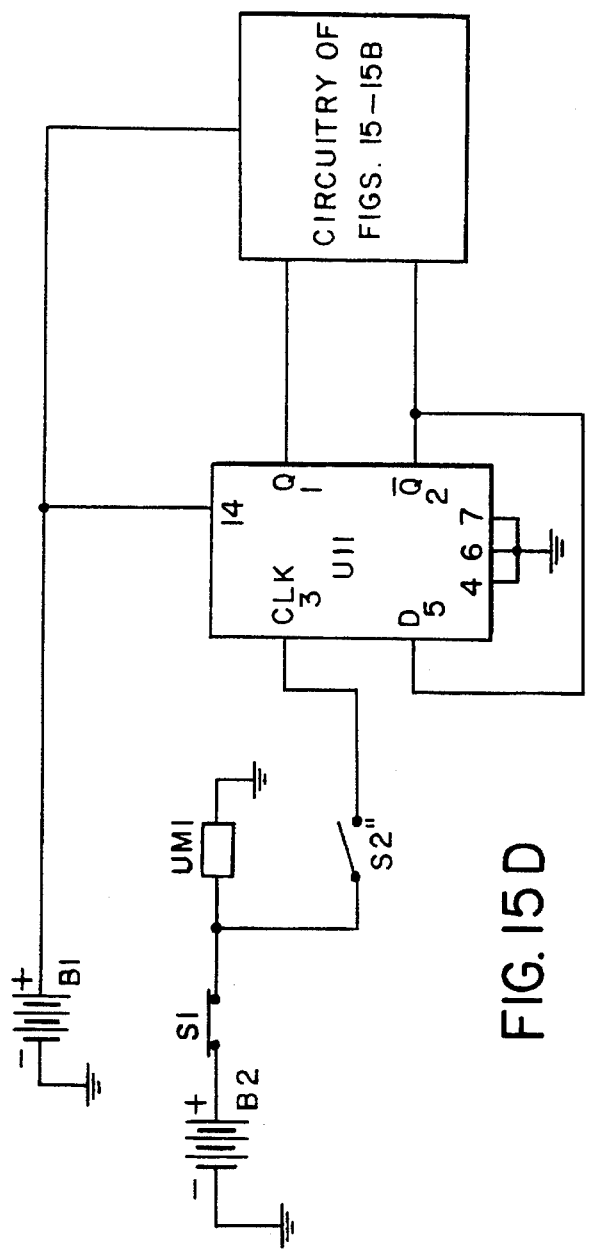
FIG. 15D illustrates a voice activated remote control system.

A system with a voice activated remote control is shown in FIG. 15D. A voice recognition design means UM1, known to those skilled in arts such as the computer arts, is incorporated a the remote control device for this form of the anti-theft system. As is understood by those skilled in the art, voice recognition means UM1 can be programmed to react only to certain voice patterns. Upon activation, means UM1 will close the remote receiver switch S2" and send a high signal to U11 thereby placing a high output on pin 1 or on pin 2 of U11 depending on the system configuration at that moment. All other operations are the same as discussed above.

Figure 16:
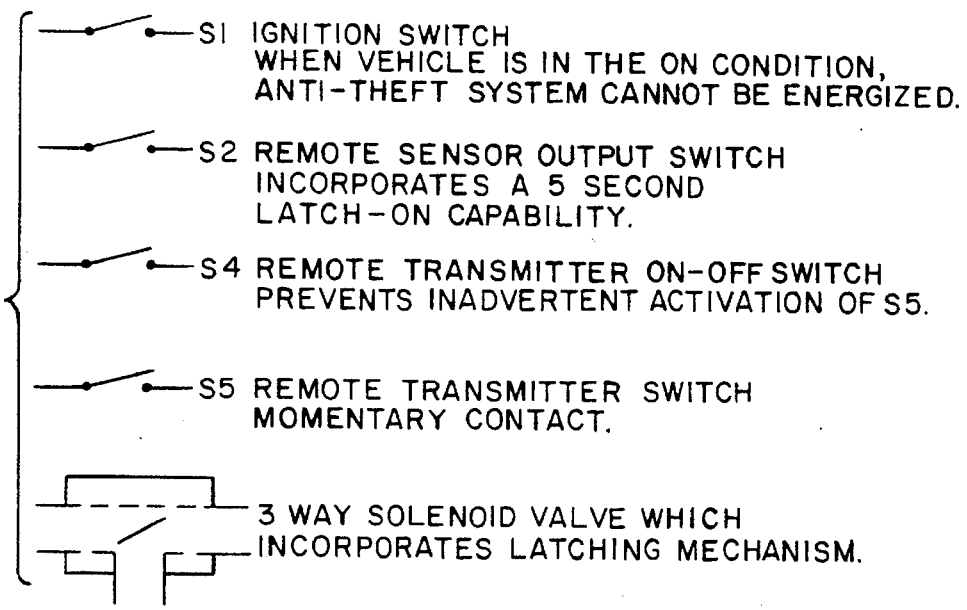
FIG. 16 illustrates the components used in the system and the safety features that prevents accidental setting of the system while the vehicle is in motion.

As indicated in FIG. 16, the system includes safety devices built into the system and include the use of the main vehicle ignition switch S15. This switch causes the switch S1 in FIG. 15 to be closed when the vehicle is off. When switch S1 is closed, relay K1 of FIG. 15 cannot be repositioned without an intentional electrical signal since this relay is a latch type relay. Remote sensor switch S2 of FIG. 15, being a 5-second latch-on type, cannot reapply a signal to element U1 without pressing switch S5 of FIG. 15C on remote transmitter RT1 providing the remote transmitter on/off switch S4 is set to the on position. The on/off switch S4 of FIG. 15C is used to prevent inadvertent energization of the anti-theft system while the vehicle is in motion. The vehicle ignition switch is open when the vehicle is in motion, thereby preventing inadvertent actuation of the anti-theft system. Element B2 is located internally of the system and prevents tampering with the system once the system is energized cutting power from element B1 to the motor 326, so that the system cannot be released. The anti-theft system is controlled only by the remote transmitter and receiver with its internal battery supply.

The complete anti-theft system can be encased in a small steel container that is 4 inches by 10 inches by 10 inches. The container can be located anywhere in the vehicle, and can be made tamperproof, or it can be connected to an alarm system that is activated if tampering is attempted.

Figure 17:
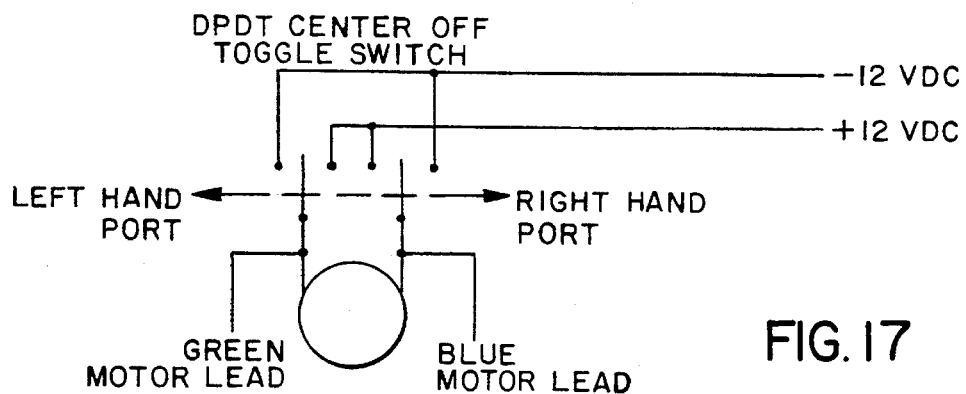
FIG. 17 illustrates a wiring diagram for a pump/motor used in the anti-theft system.
Figure 17A:
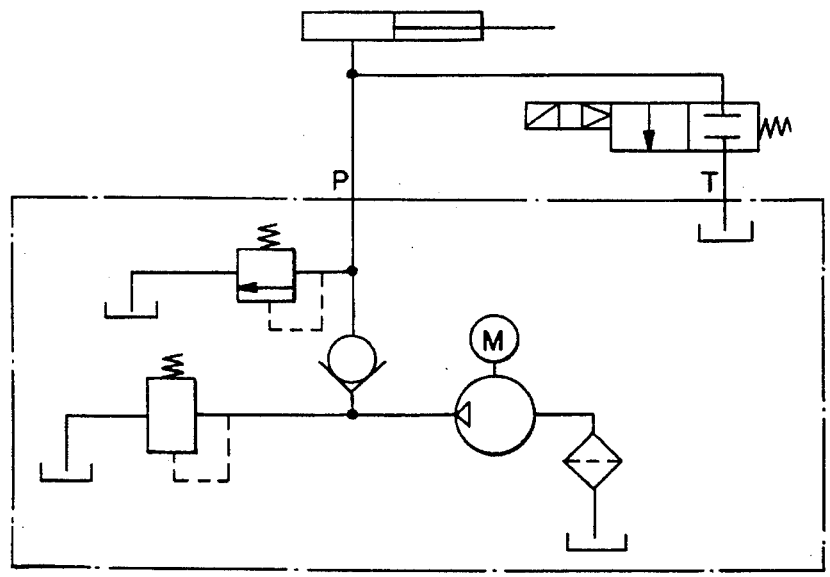
FIG. 17A illustrates a hydraulic circuit for the anti-theft system.

Schematic electrical and hydraulic diagrams are shown in FIGS. 17 and 17A with the hydraulic motor driven pump being connected to the dual 3-way latching solenoid.

It is understood that while certain forms of the present invention have been illustrated and described herein, it is not to be limited to the specific forms or arrangements of parts described and shown.

I claim:

1. An anti-theft system for use on a motor vehicle comprising:

A) a vehicle braking system that includes a hydraulic cylinder in at least one vehicle wheel, said vehicle braking system further including shoe/puck-like braking elements that are connected at one end to said hydraulic cylinder to be moved when said hydraulic cylinder is moved, said braking system further including a brake drum located to be engaged by other ends of said shoe/puck-like elements when said shoe/puck-like elements are moved by said hydraulic cylinder, said braking system further including means for forcing hydraulic fluid into said hydraulic cylinder, said means including a vehicle braking system fluid conduit fluidically connected to said hydraulic cylinder to transfer hydraulic fluid therewith;

B) locking means for locking said shoe/puck-like elements in a position engaging said brake drum, said locking means including
  (1) a fluid system that forces hydraulic fluid into said hydraulic cylinder, said fluid system including
    (a) a fluid pump having a fluid inlet and a fluid outlet,
    (b) a fluid reservoir,
    (c) fluid connection means fluidically connecting said fluid pump to said fluid reservoir and to said hydraulic cylinder for transferring hydraulic fluid between said fluid pump, said fluid reservoir and said hydraulic cylinder,
    (d) a plurality of electrically controlled fluid control valves in said fluid connection means including
      (i) a first valve biased to normally fluidically connect said pump outlet to said fluid reservoir for transferring hydraulic fluid between pump outlet and said fluid reservoir when said first valve is in a connecting condition,
      (ii) a second valve biased to normally fluidically connect said hydraulic cylinder to said pump inlet for transferring hydraulic fluid between said hydraulic cylinder and said pump inlet when said second valve is in a connecting condition,
      (iii) a third valve biased to normally fluidically disconnect said pump outlet from said hydraulic cylinder for preventing transfer of hydraulic fluid between said pump outlet and said hydraulic cylinder when said third valve is in a disconnecting condition, and
      (iv) a fourth valve biased to normally fluidically disconnect said pump inlet from said reservoir for preventing transfer of hydraulic fluid between said pump inlet and said reservoir when said fourth valve is in a disconnecting condition;
  (2) an electrical circuit that includes
    (i) a power source,
    (iii) a pump control means,
    (iii) a first electrical lead connecting said power source to said pump control means,
    (iv) a main switch in said first electrical lead,
    (v) a remotely controlled switch in said first electrical lead,
    (vi) a system armed indicator connected on one side thereof to said power source and on another side thereof to ground,
    (vii) a system disarmed indicator connected on one side thereof to said power source and on another side thereof to ground, and
    (viii) a first ganged switch coupled to said system armed indicator and to said system disarmed indicator and including a means for electrically connecting said system armed indicator to said power source while simultaneously disconnecting said system disarmed indicator from said power source;

C) said pump control means including
  (1) a pressure differential transducer fluidically connected to said hydraulic cylinder and to ambient pressure for comparing ambient pressure to pressure in said hydraulic cylinder, and
  (2) a plurality of electrical switches including
    (a) first and second transducer switches,
    (b) a first normally closed switch connecting said pump to said power source and connected to said first transducer switch,
    (c) a first normally open switch connecting said pump to said power source and to said second transducer switch, and
    (d) a second ganged switch connecting said first normally closed switch to said power source while simultaneously disconnecting said first normally open switch from said power source and vice versa; and D) means connecting said remotely controlled switch to said plurality of electrically controlled fluid valves and to said plurality of electrical switches so operation of said remotely controlled switch after said main switch is closed to arm said system will operate said fluid valves to fluidically connect said pump inlet to said hydraulic reservoir and said pump outlet to said hydraulic cylinder for transferring fluid therebetween and will activate said differential pressure transducer to sense pressure in said hydraulic cylinder, said differential pressure transducer activating said first normally closed switch to disconnect power from said pump when pressure in said hydraulic cylinder reaches a predetermined level.

2. The anti-theft system defined in claim 1 further including a timer mechanism which includes timer means for automatically disconnecting said pump from said power source after a predetermined time after said remotely controlled switch is operated to disarm said system, said timer means including a normally closed switch which connects said fluid pump to said power source, a solenoid connected to said remotely controlled switch to be activated when said remotely controlled switch is Operated, a transistor, a solenoid-controlled switch and a timing circuit connected to said solenoid-controlled switch and to said transistor to begin timing when said remotely controlled switch is closed, said timing circuit including biasing means connected to said solenoid-controlled switch and to said transistor and which controls said transistor after said solenoid-controlled switch is closed.

3. The anti-theft system defined in claim 1 further including a first one-way fluid flow control valve between said pump outlet and said vehicle braking system fluid conduit.

4. The anti-theft system defined in claim 3 further including a second one-way fluid flow control valve in said vehicle braking system fluid conduit upstream of said master cylinder.

5. An anti-theft system for use on a motor vehicle comprising:
A) a vehicle braking system that includes a hydraulic cylinder in at least one vehicle wheel, said vehicle braking system further including shoe/puck-like braking elements that are connected at one end to said hydraulic cylinder to be moved when said hydraulic cylinder is moved, said braking system further including a brake drum located to be engaged by other ends of said shoe/puck-like elements when said shoe/puck-like elements are moved by said hydraulic cylinder, said braking system further including means for forcing hydraulic fluid into said hydraulic cylinder, said means including a vehicle braking system fluid conduit fluidically connected to said hydraulic cylinder for transferring hydraulic fluid to and from said hydraulic cylinder;

B) locking means for locking said shoe/puck-like elements in a position engaging said brake drum, said locking means including (1) a fluid system that forces hydraulic fluid into said hydraulic cylinder, said fluid system including
   (a) a reversible fluid pump having a fluid inlet and a fluid outlet,
   (b) a fluid reservoir,
   (c) fluid connection means fluidically connecting said reversible fluid pump to said fluid reservoir and to said hydraulic cylinder for transferring hydraulic fluid between said reversible fluid pump, said fluid reservoir and said hydraulic cylinder, and
(2) an electrical circuit that includes
   (a) a power source,
   (b) a pump control means,
   (c) a first electrical lead connecting said power source to said pump control means,
   (d) a main switch in said first electrical lead,
   (e) a remotely controlled switch in said first electrical lead,
   (f) a system armed indicator connected on one side thereof to said power source and on another side thereof to ground,
   (g) a system disarmed indicator connected on one side thereof to said power source and on another side thereof to ground, and
   (h) a first ganged switch coupled to said system armed indicator and to said system disarmed indicator and including a means for electrically connecting said system armed indicator to said power source while simultaneously disconnecting said system disarmed indicator from said power source;

C) said pump control means including
   (1) a pressure differential transducer fluidically connected to said hydraulic cylinder and to ambient pressure, and
   (2) a plurality of electrical switches including
      (a) first and second transducer switches,
      (b) a first normally closed switch connecting said pump to said power source and connected to said first transducer switch to disconnect said pump from said power source when pressure differential is above a pre-set level and to reconnect said pump to said power source when said pressure differential is at or below said pre-set level,
      (c) a first normally open switch connecting said pump to said power source and to said second transducer switch, and
      (d) a second ganged switch connecting said first normally closed switch to said power source while simultaneously disconnecting said first normally open switch from said power source and vice versa;

D) means connecting said remotely controlled switch to said plurality of electrical switches so operation of said remotely controlled switch after said main switch is closed to arm said system will activate said differential pressure transducer to sense pressure in said hydraulic cylinder, said differential pressure transducer operating to disconnect power from said pump when pressure in said hydraulic cylinder reaches a predetermined level.

6. An anti-theft system for use on a motor vehicle comprising:
A) a vehicle braking system that includes a hydraulic cylinder in at least one vehicle wheel, said vehicle braking system further including shoe/puck-like braking elements that are connected at one end to said hydraulic cylinder to be moved when said hydraulic cylinder is moved, said braking system further including a brake drum located to be engaged by other ends of said shoe/puck-like elements when said shoe/puck-like elements are moved by said hydraulic cylinder, said braking system further including means for forcing hydraulic fluid into said hydraulic cylinder, said means including a vehicle braking system fluid conduit fluidically connected to said hydraulic cylinder for transferring hydraulic fluid to and from said hydraulic cylinder;

B) locking means for locking said shoe/puck-like elements in a position engaging said brake drum, said locking means including
   (1) a fluid system that forces hydraulic fluid into said hydraulic cylinder, said fluid system including
      (a) a fluid pump having a fluid inlet and a fluid outlet,
      (b) a fluid reservoir,
      (c) fluid connection means fluidically connecting said fluid pump to said fluid reservoir and to said hydraulic cylinder for transferring hydraulic fluid between said fluid pump and said fluid reservoir,
      (d) a check valve in said fluid connection means for permitting fluid flow in one direction while preventing fluid flow in an opposite direction,
      (e) a hydraulic fluid pressure switch in said fluid connection means for controlling said fluid pump,
      (f) a three way solenoid controlled fluid valve having one port fluidically connected to said check valve, a second port fluidically connected to a brake element in a vehicle wheel, and a third port fluidically connected to said fluid reservoir via a second conduit for transferring fluid between said three way solenoid, said check valve, said brake element and said fluid reservoir; and C) a remote control system for operating said solenoid and said pump and including means for electrically connecting said solenoid and said pump to a power source when said remote control system is operated and including a transistor, biasing means for biasing said transistor and means connected to said remote control system for connecting said solenoid to a power source when said remote control System is activated, switch means activated by said solenoid for connecting said power to said biasing means when said remote control system is operated, said biasing means including means for charging said biasing means to a prescribed level to actuate said transistor a pre-set time after activation of said remote control system.

7. The anti-theft system defined in claim 6 wherein said remote control system includes a relay electrically connected to said solenoid.

8. The anti-theft system defined in claim 7 wherein said remote control system further includes an integrated circuit flip/flop electrically connected to said power source and to a voice-activated element.

9. The anti-theft system defined in claim 8 wherein said remote control system further includes an operational amplifier connected to said flip/flop.

10. The anti-theft system defined in claim 9 wherein said remote control system further includes a second operational amplifier connected to said first operational amplifier.

11. The anti-theft system defined in claim 8 wherein said remote control system further includes a transistor connected to said flip/flop.

12. The anti-theft system defined in claim 8 wherein said remote control system further includes a second transistor connected to said flip/flop.

13. The anti-theft system defined in claim 8 wherein said voice recognition element is connected to said flip/flop.

\* \* \* \* \*